(12) United States Patent
Jia et al.

(10) Patent No.: US 11,019,316 B1
(45) Date of Patent: May 25, 2021

(54) SEQUENTIAL SPECTRAL IMAGING

(71) Applicant: TDONE, LLC, San Jose, CA (US)

(72) Inventors: Zhang Jia, San Jose, CA (US);
Xueping Cheng, Singapore (SG)

(73) Assignee: TDONE, LLC, San Jose, CA (US)

( * ) Notice: Subject to any disclaimer, the term of this patent is extended or adjusted under 35 U.S.C. 154(b) by 0 days.

(21) Appl. No.: 16/272,456

(22) Filed: Feb. 11, 2019

Related U.S. Application Data

(60) Provisional application No. 62/628,795, filed on Feb. 9, 2018.

(51) Int. Cl.
*H04N 9/04* (2006.01)
*H04N 9/47* (2006.01)

(52) U.S. Cl.
CPC .......... *H04N 9/47* (2013.01); *H04N 9/04521* (2018.08)

(58) Field of Classification Search
None
See application file for complete search history.

(56) References Cited

U.S. PATENT DOCUMENTS

2013/0215290 A1* 8/2013 Solhusvik .......... H04N 5/35572
348/231.99
2016/0047693 A1* 2/2016 Kaufman .................. G01J 5/10
250/340
2016/0364634 A1* 12/2016 Davis .................. G06Q 20/208

OTHER PUBLICATIONS

Wayback machine document dated Feb. 19, 2006 showing color filter array designs on website http://www.quadibloc.com/other/cfaint.htm (Year: 2006).*

* cited by examiner

*Primary Examiner* — Mark T Monk
(74) *Attorney, Agent, or Firm* — Alston & Bird LLP

(57) ABSTRACT

One embodiment includes a sequential spectral imaging system with a color filter disposed over imaging sensor. The color filter includes zones of multiple color elements of discrete or continuous spectra. The color filter is configured to have multiple cycles of wavelength bands along diagonal lines of the imaging sensor, each cycle of wavelength bands includes a full spectra from red to blue. Another embodiment combines an imaging sensor of a wide FOV with pixelated color filters and a spectra sensor of smaller FOV. A calibration technique acquires imaging sensor's spectral response. The sequential spectral imaging system acquires a sequence of continuous frames of spatial and spectral data during recording an object moving relatively to the camera. Multiple frames of the moving object are tracked sequentially. Image processing to correct distortion and extract features enables identification and tracking of the object. The object's full spectra is established by connecting different frames.

14 Claims, 12 Drawing Sheets

Diagonal color filter

Multi-zone diagonal color filter

SEQUENTIAL SPECTRAL IMAGING

CROSS REFERENCE OF RELATED APPLICATION

The present application claims the priority to U.S. provisional Application No. 62/628,795, entitled "Sequential Spectral Imaging", filed on Feb. 9, 2018, which is incorporated herein by reference in its entirety.

TECHNICAL FIELD

This application is related to the technical field of imaging, in particular, it is related to imaging applications using mobile devices.

BACKGROUND

Cameras are widely used in mobile phones, cars, personal computers, and smart homes. In addition to the function of photography, they represent a key enabler for many artificial intelligence (AI) applications, such as in smart homes, advanced agriculture, autopilot for cars, gesture control, and face recognition, etc. Most of these applications rely on geometrical (2D or 3D) information to enable recording and decoding of complex information. One additional important dimension of information is spectral response. Light consists of multiple continuous wavelengths and these wavelengths in the visible range are shown as different visual colors.

Such spectral information (UV, IR, Visible) can be used as additional information for the intelligent systems to make comparison and judgment.

Most cameras today consist of three channels (RGB) or a single black and white channel. A CCD or CMOS photo-sensing device is usually used and RGB color filters are applied on the sensor. Usually such RGB color filters today are made of organics-based transmissible materials, deposited as a thin film on the sensor chip and patterned over the photo-sensing layer with standard photolithography.

Instrument used in conventional hyperspectral imaging is usually very bulky. In addition, because the spatial scanning approach to form a 2D image of spectra and collect calibration spectral data takes lengthy time, it is inadequate to support aforementioned intelligent applications. Some references mentioned hyperspectral systems but lacked practical device disclosures, for example, WO 2017/093431 by Ahlberg, Jorgen. A fast and efficient continuous spectral imaging system light weight and inexpensive for mobile devices is in imminent need.

SUMMARY

A sequential spectral imaging camera is disclosed according to one embodiment of the application. The sequential spectral imaging camera includes an image sensor amounted on a camera, wherein the image sensor comprises a plurality of pixels sensitive to light signals; a color filter disposed on the image sensor, wherein the color filter is configured to respond to a plurality of colors based on locations on the color filter, wherein the image sensor acquires a sequence of image frames each associated with spectral, spatial, and temporal data of a moving object; a clock used to add temporal information to the sequence of image frames, for each pixel on the image sensor; a calibration module configured to provide spectral calibration data for each pixel of the image sensor; and a computer system capable of recording the sequence of image frames, comparing data of each pixel with the spectral calibration data from the calibration module, synchronizing the temporal information from the clock, and reconstructing images of the moving object.

The color filter may have discrete or continuous wavelength regions from 300 nm to 1600 nm. The spectral responses for all pixels can be calibrated ahead of imaging taking using a calibration setup and method disclosed in the application.

The color filter may have wavelength regions arranged monotonically along column and rows of the image sensor. The color filter may have multiple cycles of wavelength bands along diagonal lines or along column/row lines of the imaging sensor, each cycle of wavelength bands includes a full spectra. The advantage of doing diagonally is to provide flexibility in data processing when the imaging camera is held by a user in horizontal or vertical orientations.

Multiple frames of the same moving object are tracked sequentially. Image processing such as correction for distortion and extraction of feature enables identification and tracking of the same object across multiple frames. Connecting the spectral response of the same object over different frames the object's full spectrum can be established. Furthermore, combined with algorithm such as simultaneous localization and mapping (SLAM), 3D volumetric spectral information can also be obtained.

Another sequential spectral imaging system is also disclosed. The second sequential spectral imaging system comprising: an image sensor module comprising a plurality of pixels sensitive to light signals in three color bands, wherein the image sensor acquires a sequence of image frames each associated with spectral, spatial, and temporal data of a moving object, wherein the image sensor has a first field of view; a spectral sensor module disposed next to the image sensor, wherein the spectral sensor comprises of a plurality of color elements associated with multiple color absorption ranges, and an optical assembly to distribute light on the spectral sensor, wherein the spectral sensor has a second field of view smaller than the first field of view; a clock used to add temporal information to the sequence of image frames, for each pixel on the image sensor; a calibration module configured to provide spectral calibration data for each element of the spectral sensor; and a computer system capable of recording the sequence of image frames, comparing the spectral data of each pixel with the spectral calibration data from the calibration module, synchronizing the temporal information from the clock, and reconstructing images of the moving object. The calibration module includes a broadband light source to emit light in a range of wavelengths, a wavelength selective device capable of scanning and dividing the broadband light source into multiple wavelengths, and an integration sphere to project the light into various elements of the spectral sensor; wherein the calibration module collects and saves the spectral calibration data of the spectral sensor.

The disclosure also includes a method to operate a sequential spectral imaging camera as, comprising: providing an image sensor amounted on a camera, wherein the image sensor comprises a plurality of pixels sensitive to light signals; calibrating spectral data for each pixel of the image sensor; disposing a color filter on the image sensor, wherein the color filter is configured to respond to a plurality of colors based on locations on the color filter, wherein the image sensor acquires a sequence of image frames each associated with spectral, spatial, and temporal data of a moving object; adding temporal information from a clock to the sequence of image frames for each pixel on the image sensor; tracking the spectral, spatial, temporal pixel data of the sequence of different image frames from the same object on the image sensor by a computer system; processing data of each pixel with the spectral calibration data from the calibration module synchronizing the temporal information from the clock; and reconstructing images of the moving object.

Optionally, an imaging processing techniques is used to correct distortion with the help of an algorithm such as simultaneous localization and mapping (SLAM) and 3D volumetric spectral extraction.

Another embodiment includes a method to operate a sequential spectral imaging system, comprising: providing an image sensor amounted on a camera, wherein the image sensor comprises a plurality of pixels sensitive to light signals, wherein the image sensor acquires a sequence of image frames each associated with spectral, spatial, and temporal data of a moving object; wherein the image sensor comprises a plurality of pixels sensitive to light signals, wherein the image sensor acquires a sequence of image frames each associated with spectral, spatial, and temporal data of a moving object; providing a spectral sensor next to the image sensor to receive defocused light from the optical homogenizer; calibrating the sequential spectral imaging system by adjusting the second FOV inside the first FOV; adding temporal information from a clock to the sequence of image frames for each pixel on the image sensor; tracking the spectral, spatial, temporal pixel data of the sequence of different image frames from the same object on the image sensor by a computer system; processing data of each pixel with the spectral calibration data from the calibration module; synchronizing the temporal information from the clock; and reconstructing images of the moving object; adjusting the second field of view of the spectral sensor into inside the first field of view of the image sensor.

BRIEF DESCRIPTION OF DRAWINGS

Figure 1A:
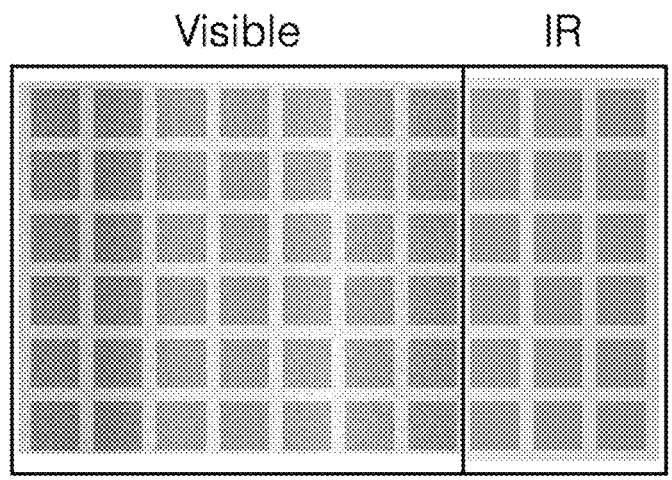

Having thus described the invention in general terms, reference will now be made to the accompanying drawings, which are not necessarily drawn to scale, and wherein:

FIG. 1A is a schematic view of a spatially variable color filter having orthogonally arranged wavelengths in a sequential spectral imaging device according to one embodiment of the disclosure.

Figure 1B:
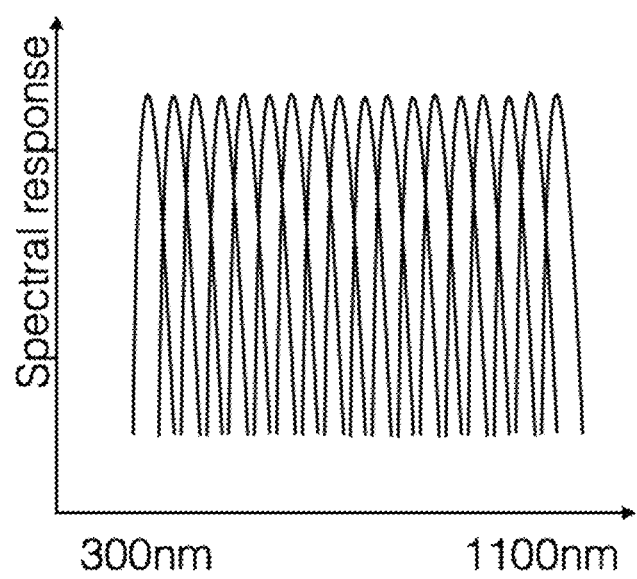

FIG. 1B shows spectral response of the camera detector after color filter in wavelength range 300 nm to 1100 nm.

Figure 1C:
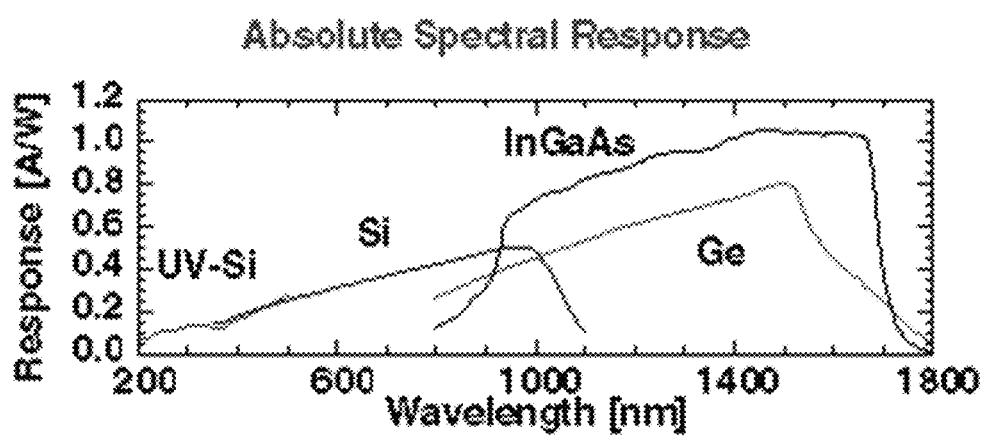

FIG. 1C shows the absorption coefficient curve of silicon for wavelength range 300 nm to 1100 nm.

Figure 2A:
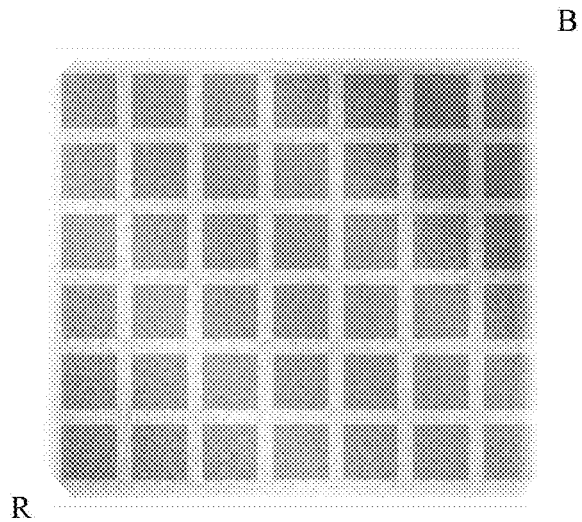
Figure 2B:
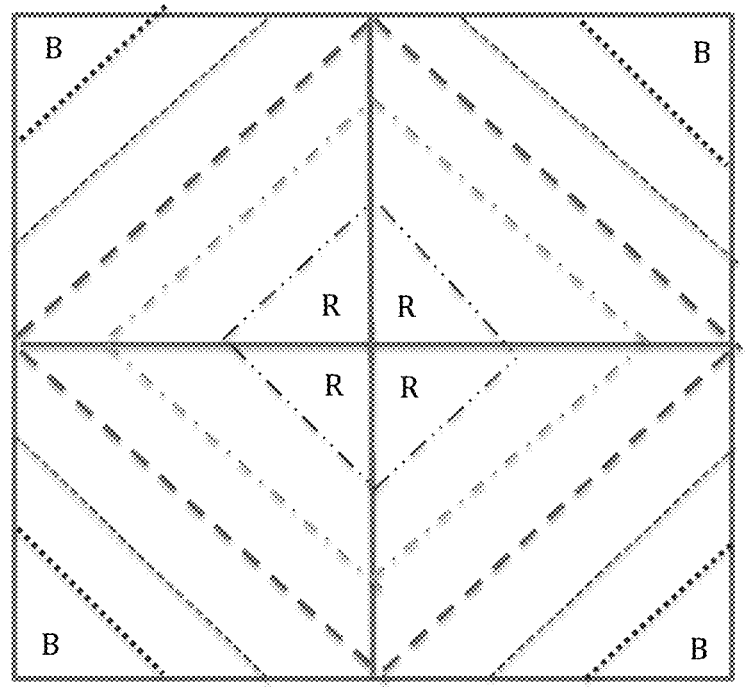

FIG. 2A shows a schematics of a spatially variable color filter having diagonally arranged wavelengths in a sequential spectral imaging device according to one embodiment of the disclosure. FIG. 2B shows another spatially variable color filter having 2×2 diagonally arranged wavelengths bands, according to one embodiment of the disclosure.

Figure 3A:
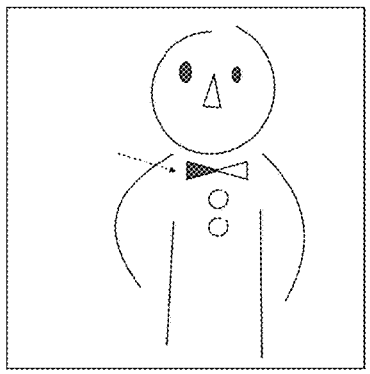
Figure 3B:
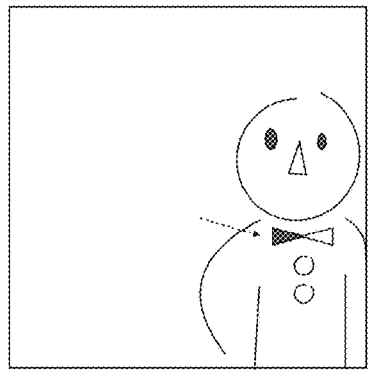
Figure 3C:
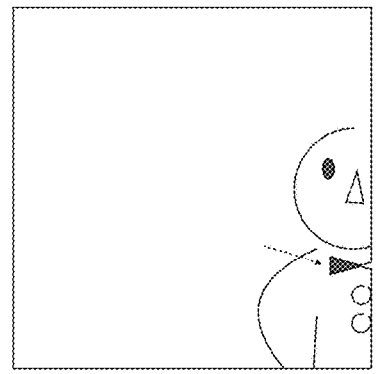

FIGS. 3A-3C are schematics of an image sequence consisting of 3 moving frames in one path.

Figure 4A:
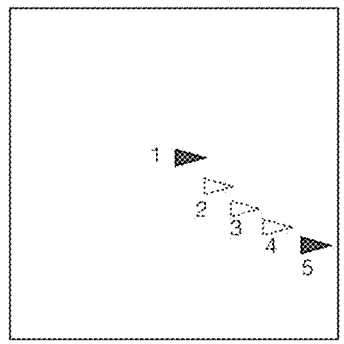
Figure 4B:
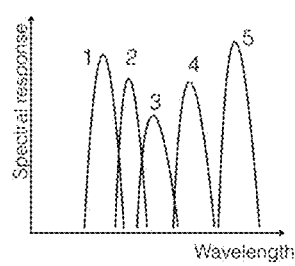
Figure 4C:
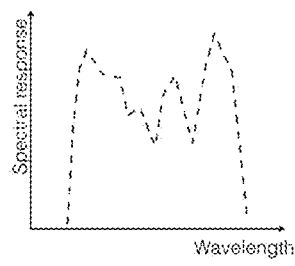

FIGS. 4A-4C show the object is tracked and data is recorded as the region of interest (ROI) moves through the five frames in a sequence. The intensity and spectra of each pixel at a sequence of times are recorded along the imaging path. Using spectral information of the path, the object's spectrum is reconstructed.

Figure 5:
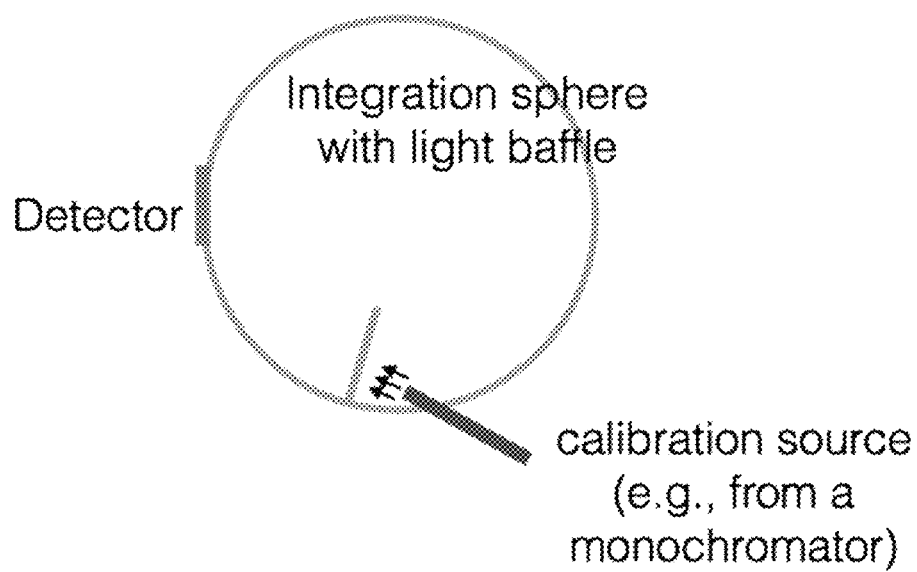

FIG. 5 shows schematics of a spectral response calibration setup for the sequential spectral imaging system according to one embodiment of the disclosure.

Figure 6:
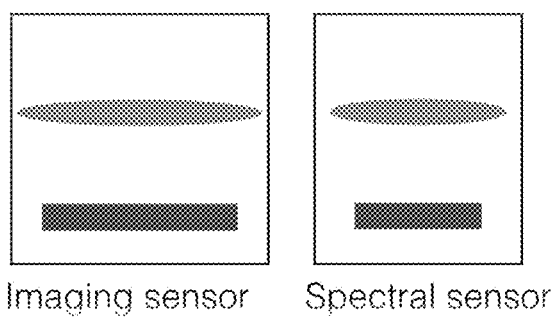

FIG. 6 shows a schematic diagram of a pair of an imaging sensor and a spectral sensor, according to one embodiment of the disclosure.

Figure 7:
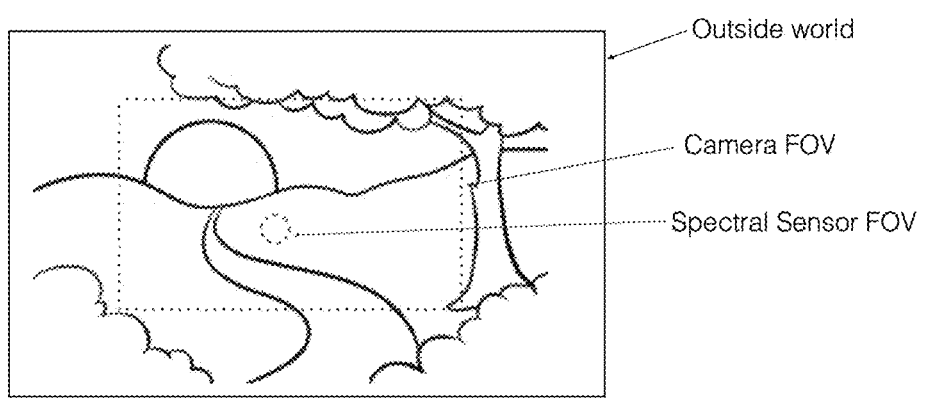

FIG. 7 shows one image within the camera's field of view acquired with a sequential spectral imaging device according to a second embodiment of the disclosure.

Figure 8A:
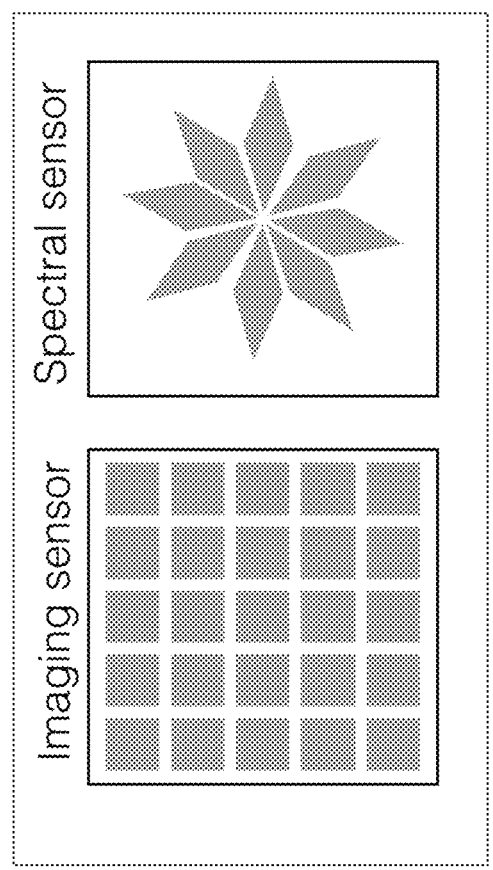
Figure 8B:
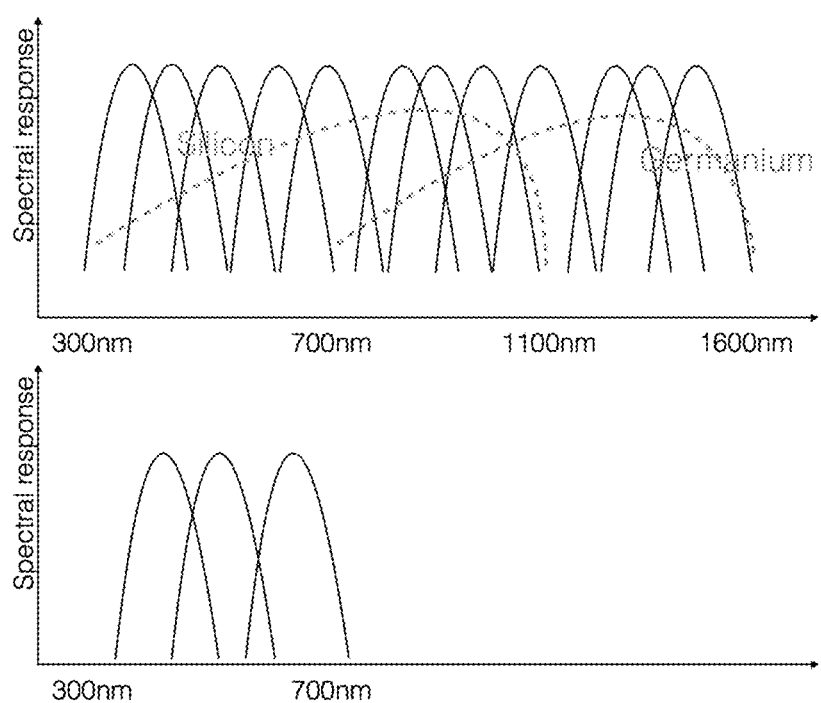

FIGS. 8A-8B show a combined spectral system characteristics according to the second embodiments of the disclosure.

Figure 9A:
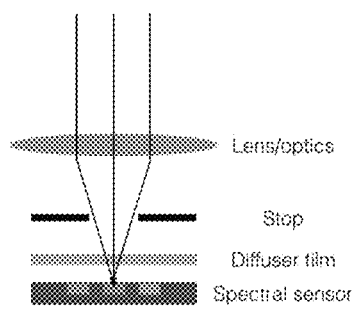
Figure 9B:
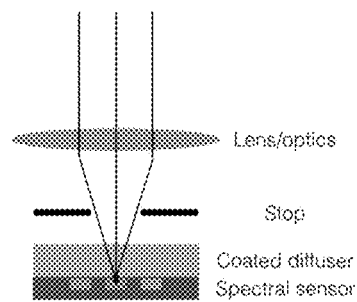
Figure 9C:
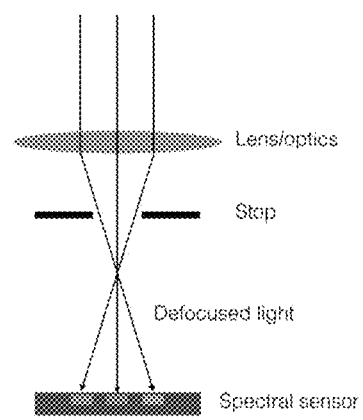

FIGS. 9A-9C show three different arrangements of spectral sensor modules according to the second embodiments of the disclosure.

Figure 10:
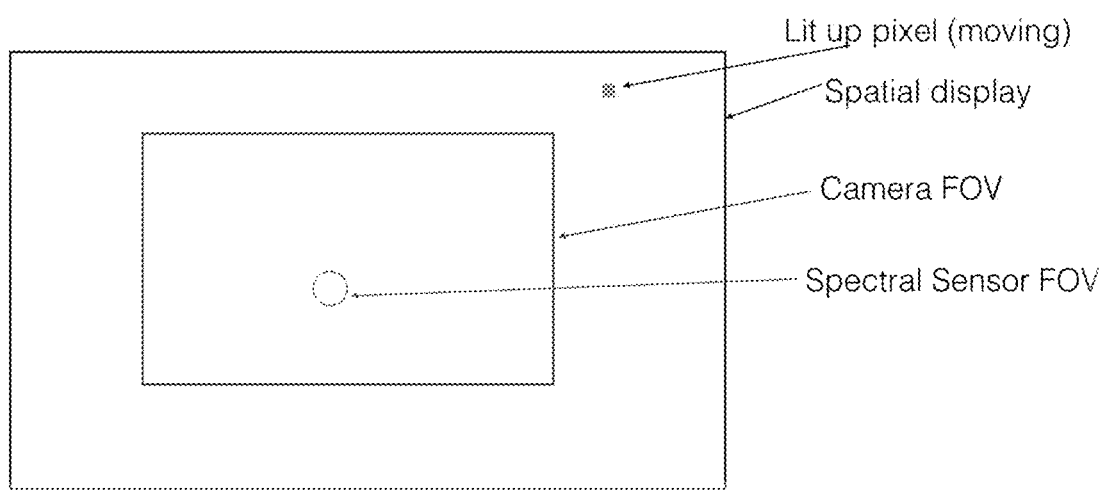

FIG. 10 shows a calibration method for the second embodiment of the disclosure. It shows the FOVs of camera and spectral sensor overlay in a display unit that is used to calibrate the sensing system.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "I") is used herein in both the alternative and conjunctive sense, unless otherwise indicated. The terms "illustrative" and "exemplary" are used to be examples with no indication of quality level. Like numbers refer to like elements throughout. FIG. 3A is a schematic view of a spatially variable color filter having orthogonally arranged wavelengths in a sequential spectral imaging device according to one embodiment of the disclosure.

The present disclosure includes a spatially varied color filter discussed in the following paragraphs.

FIG. 1A is a schematic view of the spatially variable color filter having orthogonally arranged wavelengths in a sequential spectral imaging device, according to one embodiment of the disclosure.

FIG. 1B is an exemplary schematic spectral characteristics of the spatially variable color filter at a number of locations on the filter in wavelength range 300 nm to 1100 nm, after passing the color filter array of FIG. 1A. The wavelength characteristics of filter array is monotonically changed in a column and row pattern from UV at the left of the filter array, visible in the middle, and IR at the right. The spectral response curves from the filters are plotted in FIG. 1B.

Referring to FIG. 1C, a silicon detector absorbs significantly from UV to mid-infrared light up to 1100 nm from silicon's bandgap at ~1.1 eV. So a single silicon-based image sensor in a camera's image sensor matrix can be optionally divided into generally multiple visible and IR regions by a spatially variable color filter having continuous color characteristics like the filter matrix shown in FIG. 1A.

In a conventional camera, each imaging element in the camera contains at least three parallel color filters, typically red, green and blue, and each snapshot image is an instant colorful picture of the object. As the object moves relative to the camera, a continuously taken colorful video can be generated.

Unlike the conventional camera imaging described above, the sequential spatial imaging technique in this invention does not apply multiple color filters into each imaging element. Instead it uses a single spatially variable color filter on a camera, gets a snapshot (or one frame) of the object image under the spatially variable color filter at one location and one moment. When the object moves and a sequence of images of the moving object is generated along the path, each image has "distorted" but different color tints associated with the different locations where the images are taken. In this way although each one of the sequential images is a "distorted" color image from the single spatially variable color filter, the sequence of those images by the same spatially variable color filter taken at sequentially different times and different locations are incorporated into one image process database and corresponding colors are reconstructed into a picture.

There are a number of techniques to form a spatially variable color filter. In one arrangement the spatial variation is continuous so the wavelength changes gradually without discrete distinct wavelength elements. This type of continuously varying wavelength filter can be made by depositing an interference film with increasing thickness on a smooth substrate. In another arrangement, the color filter plate may be divided into a matrix of discrete color elements, the wavelength characteristics of each element differs from its neighbors. This type of spatially variable color filter can be fabricated in semiconductor lithography process by using a mask arranged to have an array of different light exposures to a photosensitive film, to form an array of discrete film elements.

The color filter typically consists of narrow band pass filters, discrete or continuous, when combined with pixel characteristics. Combination of each camera pixel and the filter has a FWHM of 1-20 nm, depending on the pixel size and the filter variation width in a spectral range from UV, visible to mid-infrared.

FIG. 4A illustrates an exemplary color filter having a diagonally aligned spectral elements according to another embodiment of the disclosure. In one exemplary arrangement, there are wavelength bands along a diagonal line of the imaging sensor, wavelength bands include a full spectrum. The wavelengths may be arranged sequentially along the diagonal line from the lower left corner to the upper right corner.

Multiple cycles of wavelength bands can also be formed in a color filter of the image sensor. The multiple cycles may form an N×N matrix. FIG. 2B shows another spatially variable color filter having 2×2 diagonally arranged wavelengths bands. Referring to FIG. 2B, wavelength bands from red (R) to blue (B) are arranged center to outer corners diagonally, similarly to the one cycle arrangement in FIG. 2A. For example, they can be made from blue to red in the lower left cycle, then red to blue in the upper right cycle, then red to blue in the lower right cycle, and blue to red in the upper left cycle, etc. The reverse order of wavelengths in neighboring cycles provides advantages of smooth signal processing for moving objects in sequential frames. At the borders of neighboring cycles, wavelength bands are arranged with minimum color gaps to guarantee smooth transition of moving objects as their image on the sensor falls from one cycle to the next. For example, wavelength bands in the first cycle may be fabricated from red to blue, wavelength bands in the neighboring cycles should have the colors arranged from blue to red diagonally or arranged with continuous colors across the borders.

In addition, the color filter can include multiple zones of other patterns, when zones are not squares, for example, triangular or ring shaped, or serpentine shaped zones, all of which have diagonally varying wavelength bands arranged similarly to what is shown in FIG. 2B. Their borders are also patterned with minimum color gaps for signal processing efficiency of moving object images as described above.

In this embodiment the wavelength of the color filter is arranged monotonically along diagonal orientations in each cycle or zone. The overall spatially variable color filter color characteristics therefore also form diagonally oriented color stripes in the rectangular camera image area.

This type of diagonal filters in FIGS. 2A and 2B have an advantage for flexibility in taking images with a horizontally or vertically placed display device like a cell phone.

For example, a time domain sequential imaging may appear differently when the cell phone changes its orientation. A sequence of frames taken at different times as image data scan performed in the direction of columns in one orientation will appear differently when the same image data scan is performed in the direction of rows after the camera is turned 90 degrees. As the color filter is applied in 90 degree different orders, the sequence of frames will undergo different color reconstruction. Whereas in a diagonally aligned color filter, row and column data matrix elements are symmetrical and interchangeable, therefore the color reconstruction is simpler when camera is rotated 90 degrees in a user's hand. Therefore, a diagonal design allows the flexibility of camera movement and efficiency in data collection.

In a spectrally filtered system, each pixel's spectral response has to be calibrated before imaging incorporating its spectral response sensitivity in the 300-1100 nm wavelength range. The spectra of all pixels are characterized and stored in the system memory as SP11, SP12, SP13, SPmn, . . . , etc, where SPmn refers to the spectrum in monotonically increasing $n^{th}$ pixel in the $m^{th}$ row in an array like in FIG. 2A. Here m is an integer from 1 to M (last row), and n is an integer from 1 to N (last column).

During scanning or video recording, each pixel's image intensity P11, P21, Pij, etc. is recorded for each image frame, where Pij refers to the image intensity in monotonically increasing $j^{th}$ pixel in the $i^{th}$ row. Here i is an integer from 1 to M (last row), and j is an integer from 1 to N (last column) in an array of M×N.

During scanning or video recording, each pixel has a time stamp, P11_t1, P21_t1, . . . , P11_t2, P21_t2, . . . Pij_tz, . . . etc., where Pij_tz refers to the image intensity in monotonically increasing $j^{th}$ pixel in the $i^{th}$ row recorded at time tz. Using image descriptors and image mappings, a specific object (e.g., tip of a nose, or a bow tie) at location x can be tracked through different frames over time. Pij(x)_t1, Pi'j'(x)_t2, . . . where (x) tracks the feature's position in pixel space; at the same time each pixel's intensity associated with frame i,j at the position and the pixel's intensity associated with the next frame i', j' are recorded. During this process the spectra of the reflected object image can be reconstructed. Multiple objects in one frame can be tracked simultaneously; therefore their spectra can be reconstructed simultaneously. Image perspectives and distortion of each object will be adjusted during tracking across multiple consecutive open frames.

In an imaging process, either the object or the camera, or both can move.

FIGS. 3A-3C shows schematics of an image sequence consisting of 3 moving frames of a man with a bow tie along one path, where the image including the bow tie motion is tracked by its location in the frame, its time stamp and its spectra in all three frames.

FIG. 4A shows the tracked left half of the bow tie as the region of interest (ROI) moves through five frames in a sequence. FIG. 4B shows the intensity and spectrum of each pixel in the path recorded along its path. FIG. 4C illustrates the object's spectrum is reconstructed using spectrum information of the path.

Referring to FIG. 4A the tracked data of the left half of the bow tie—the object—being the region of interest (ROI) through five frames in a sequence, at five stamped times (1-5).

FIG. 4B shows the five spectral intensities and spectra responses overlapped in one graph, detected on pixels along the moving object's path recorded by the sequential spectral imaging technique.

Referring to FIG. 4C, an envelope of the moving object's spectral data from the five exemplary frames is reconstructed using spectrum information of the path acquired from FIG. 4B.

Multiple frames of the same moving object are tracked sequentially. Image processing such as correcting for distortion and extraction of feature enables identification and tracking of the same object across multiple frames. Connecting the spectral response of the same object over different frames, the object's full spectrum can be established. Furthermore, combined with an algorithm such as simultaneous localization and mapping (SLAM), 3D volumetric spectral information can also be obtained.

FIG. 5 shows a first calibration method according to another embodiment of the present disclosure. Referring to FIG. 5, a scanning wavelength calibration source from, for example, a monochromator, applies to an integration sphere with light baffle (diffuser), or a large spherical diffuser which spans the camera's field of view (FOV). A detector maybe arranged at an appropriate location on the sphere.

Use of an integration sphere is for simulating a widely distributed light similar to what a camera collects. The diffused light from entire camera's field of view reaches the camera's image sensor. Resultant response data on all pixels is then recorded and saved as the light source wavelength changes from 300 nm to 1100 nm.

As an optional implementation, this sequential spectral imaging system can be paired with a traditional camera. During the scan, the clear images of the object are taken and their spectral information is simultaneously recorded. With SLAM algorithm using the traditional camera, the object's 3D contour can be constructed. Its surface spectral information is revealed by the paired sequential imaging system. Such additional information (3D+spectrum) can potentially improve the safety for the autonomous cars and geo-surveying drones.

The application also discloses a second sequential spectral imaging apparatus which is configured to have an imaging sensor in a conventional camera and a photo spectral sensor arranged next to the imaging sensor, according to another embodiment in the present disclosure.

FIG. 6 shows a schematic diagram of the pair of imaging sensor and photo spectral sensor as described above. These two sensors are both spectrally and spatially calibrated.

Referring to FIG. 6, in this imaging sensor, there are many detectors such as CCD or CMOS image sensors, which collect light received within the field of view (FOV) of the camera lens in front of the imaging sensor. The spectral sensor is configured to have a much smaller FOV by design of its lens.

FIG. 7 shows exemplary images acquired by the second sequential spectral imaging apparatus, according to one embodiment of the disclosure. In FIG. 7's picture of mountains and trees, the imaging camera's field of view, the smaller dashed frame), is inside the full scene to be imaged, the Outside world corresponding to the larger rectangular frame, and the field of view of the spectral sensor, corresponding to the smaller dashed circle from the spectral sensor FOV, within the camera's field of view. The spectral sensor is calibrated through a method described in FIG. 5, so the camera imaging sensor has the spectral information obtained from the spectral sensor in camera's field of view. The recorded imaging data is a combination of the two sensors.

FIG. 8A shows an exemplary sequential spectral imaging system combining sequential spectral imaging system. FIG. 8B illustrates the spectra characteristics of the system in FIG. 8A, according to the second embodiment of the disclosure. In this imaging system, a standard imaging sensor array includes color elements in lower part of FIG. 8A for each pixel, typically in red, green and blue three colors. A spectral sensor placed next to the imaging sensor array. as shown above the pixel array in FIG. 8A, is formed of multiple color pieces each of which is associated with one discrete wavelength band within the spectral range of the imaging sensor at the lower part.

Referring to FIG. 8A, the imaging sensor is set behind the color filter array in a camera and the spectral sensor designed as a cluster of 8 rhombuses for sensing multiple desired wavelength bands. Other possible shapes of a spectral sensor can be a circular "sliced pie" shape, a multi-segment square or rectangular shape. The essential intention is, by the combination of the photodiode distribution and the optics structure above the photodiodes, a uniform irradiance level across the photodiodes is achieved, i.e., the signals from the photodiodes are the same in their independence of the angle of incoming light.

Referring to FIG. 8B, the upper plot shows respective spectral responses of a silicon and a germanium camera imaging sensors, overlapped with representative color transmission curves from the spectral sensor in the wavelength range of 300 nm to 1600 nm.

Characteristics of the spectral sensors are designed for specific applications: some examples are presented as follows. Silicon is responsive for visible and near IR (up to 1100 nm) light. Germanium can be integrated on the silicon sensor to extend the wavelength up to longer near 1600 nm because germanium has a smaller band gap than silicon. Combination of Si and Ge on one detector makes it easier to achieve a wider band photo detector than CMOS or CCD image sensors.

Still referring to FIG. 8B, the lower plot shows the three-band spectral response of a camera imaging sensor in visible range from above 300 to near IR at 700 nm, the three bands are typically arranged in blue, green, and red.

FIGS. 9A-9C show three different arrangements of the spectral sensor according to the second embodiment of the disclosure. The spectral sensor consists of a number of photodiodes and each photodiode includes a color coating that passes light with a selected band of wavelengths. The spectral sensor is further equipped with an optical system in the front including optical components, e.g., lens, filters, diffusers, optical shutter, stops, etc.

Referring to FIG. 9A-9C, each of them shows a different method of homogenizing the light distribution on the spectral sensor photodiodes. In FIG. 9A, a thin diffuser film is stacked over the spectral sensor. In FIG. 9B, a coated volume (thick) diffuser is deposited on the top surface of the spectral sensor. In FIG. 9C, incoming light from the object is purposely defocused to spread the light over the spectral sensors. To collect a desired object's spectral information, a spectral sensor's field of view (FOV) must be aligned inside the camera's FOV. Therefore, the sequential spatial imaging system requires an alignment step first. This step is the spatial calibration. Shown in FIG. 10 is the overlapping FOVs of the imaging sensor of the camera drawn as the solid lined rectangular and the spectral sensor drawn as the smaller circle inside the camera FOV's rectangular. All of these two FOVs are inside the moving pixel based image.

Once the alignment is achieved by having the spectral sensor FOV inside imaging sensor's FOV, spectral calibration should be performed before imaging starts, using the technique illustrated in FIG. 5 and described above.

The camera image sensor and spectral sensor are calibrated spatially and spectrally, therefore the spectral sensor also captures specific desired regions overlapping with the FOV of the camera image sensor.

Spatial calibration is necessary, because the relative positions of the camera and the spectral sensor have to meet the optical system requirement for tolerance accuracy. First, the camera image plane is used as the reference plane. Then, spectral sensor's sensitive spots within this reference plane are located accurately. One of the ways to achieve spatial calibration is to project a moving bright spot on the display screen to light up a pixel first, and then gradually move the bright spot on the display toward the spectral sensor while recording the image sensor and spectral sensor's intensity readings. Once the intensity reading from the spectral sensor is peaked at a location, the bright spot's coordinate is in display, image sensor's bright spot coordinate in the reference plane are recorded and stored.

It is important to calibrate the full-area color response of the spectral sensor in order to get the spectra within the sensor's FOV. This can be achieved by first setting up a broad-band light source like a white light or a tunable light emitting diode LED, a tunable laser, etc., and then have the light source scanned through a monochromator. Output light having spectral response with desired spectral resolution (e.g., FWHM ~2-10 nm) can be obtained with a commercially available monochromator. This is similar to calibration disclosed in FIG. 5. Because the FOV of the spectral sensor is small, the integration sphere is usually not necessary.

In an optional way of operation, similar to the above, the time sequence of frame data from sequential images of both sensors are tracked. As a result, the spectrum of the full surface of the moving object can be reconstructed.

Sequential spectral imaging can be widely applied to various technology fields, as described in the following.

1. Camera color reproduction: sequential spectral imaging generates better color reproduction with richer and more vibrant colors than a traditional camera does. Operation improvement techniques also include opening up a camera application program on a smart device, performing object targeting, having the device scan a spectrum of the environment around the target, and determining the best color matrix to record a picture in the smart device.

2. Manufacturing line quality control: many production line relies on color spectra to inspect the quality of produced goods, such goods include car bodies, home appliance panels, cell phone enclosures, textiles, book covers, etc. The sequential spectral imaging system allows acquiring real-time 2D or 3D spectrum information of these manufacturing processes for quality inspection. In some cases, these processes' variations dynamics (for example, color variation range and trends) is known. So the spectral imaging system can be pre-calibrated against these variations, thereby providing highly accurate (for example, <0.5 just noticeable difference for color) or fairly tight tolerance results for spectral difference.

3. Better autopilot cars: sequential spectral imaging technique enables accurate collection of an autopilot environmental data with superb optical spectral data characteristics. As a result, objects on the real world roads will have better spectral resolution and consistent accuracy. These objects include road targets such like humans, animals, road blocks, and road signs. With the disclosed vision system, these objects will be more precisely identified. For example, among other things, unique headlights of nearby cars can be detected, which then applied to acquire vehicle data of their build, model, and year. Because of the high resolution, detailed finesse like a "color" on a small part of a car f can be more accurately detected, which is critical in identifying the vehicle. In another example, a "red" BMW may differ from a "red" Audi in the finer color spectra, even though they may appear to have the similar red color on a conventional camera. To recognize an item on road when driving a car, for another example, better spectral response is helpful to differentiate a mattress from a plastic bag (not a danger) or from a rock (presents a real danger).

4. Better drones: one of the applications of drones is in agriculture for dispensing pesticide or fertilizers. Often various plant diseases have different spectral/colorimetric appearances. The disclosed sequential spectral imaging system can target more accurate locations in order to dispense a precise quantity. Drones equipped with the sequential spectral imaging system and a calibrated stored database will be able to better detect if the plant has a specific disease, or it is just lacking certain nutrients. Therefore the drones can dispense needed agents more accurately.

5. Facial skin care: a human face has fine features and layers of vivid colors. A multiple wavelength light source and full spectral response from above disclosed spectra sensors applying the sequential spectral imaging technique can image more accurately by picking up all the finesse of details in a person's face. The imaging has a calibrated color resolution to enable more repeatable result in the facial light application.

6. Face recognition: spectral signal has long been used to check authenticity and counter fakes. With the sequential spectral imaging system, a sequence of images with detailed spectral information along a moving path can be acquired in a short time (<0.5 sec). Combined with current face recognition technique (2D and 3D imaging), this technique provides orders of magnitude higher security than the status quo. For example, it can effectively tell the difference between identical twins which poses high challenge often even to their family members.

However, embodiments are not limited to the particular examples. In utilizing the various aspects of the embodiments, it would become apparent to one skilled in the art that combinations or variations of the above embodiments are possible for fabricating optical interconnects. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A sequential spectral imaging camera, comprising:
    an image sensor amounted on a camera, wherein the image sensor comprises a plurality of pixels sensitive to light signals;
    a color filter disposed on the image sensor, wherein the color filter comprises a plurality of areas of continuously varying wavelengths based on locations on the color filter, wherein the image sensor acquires a sequence of image frames each associated with spectral, spatial, and temporal data of an object moving relatively to the camera, wherein one image frame corresponds to one temporal point;

a clock used to add temporal information to the sequence of image frames, for each pixel on the image sensor; and a computer system capable of recording the sequence of image frames, comparing data of each pixel with spectral calibration data from a calibration module, synchronizing the temporal information from the clock, and reconstructing images of the object;

wherein the calibration module comprises a broadband light source to emit light in a range of wavelengths, a wavelength selective device capable of scanning and dividing the broadband light source into multiple wavelengths, and an integration sphere to project the light into the image sensor, and wherein the calibration module collects and saves the spectral calibration data of each pixel of the image sensor.

2. The sequential spectral imaging camera as in claim 1, wherein the color filter comprises discrete wavelength regions from 300 nm to 1600 nm.

3. The sequential spectral imaging camera as in claim 1, wherein the color filter comprises continuous wavelength regions from 300 nm to 1600 nm.

4. The sequential spectral imaging camera as in claim 1, wherein the plurality of areas of continuously varying wavelengths have the wavelength arranged monotonically increasing along column and rows of the image sensor.

5. The sequential spectral imaging camera as in claim 1, wherein the color filter comprises N×N zones of wavelength bands, wherein each said zone of the wavelength bands includes a full wavelength spectra, wherein the wavelength bands are monotonically arranged along a diagonal line of each said zone from blue to near IR, wherein N is an integer and N>1.

6. The sequential spectral imaging camera as in claim 5, wherein the wavelength bands at edge of each zone have a same color as wavelength bands at a border in neighboring zones to smooth image transition of the object.

7. A sequential spectral imaging system as in claim 1, wherein the image sensor is made of silicon, or germanium, or a combination of silicon and germanium.

8. A sequential spectral imaging system as in claim 1, wherein the image sensor has a spectral response in the UV, visible and near IR and mid-IR range.

9. A method to operate a sequential spectral imaging camera, comprising:

providing an image sensor amounted on a camera, wherein the image sensor comprises a plurality of pixels sensitive to light signals; calibrating spectral data for each pixel of the image sensor;

disposing a color filter on the image sensor, wherein the color filter comprises a plurality of areas of continuously varying wavelengths based on locations on the color filter, wherein the image sensor acquires a sequence of image frames each associated with spectral, spatial, and temporal data of an object performing a relative motion to the camera;

adding temporal information from a clock to the sequence of image frames for each pixel on the image sensor;

tracking the spectral, spatial, temporal pixel data of the sequence of different image frames from a same object on the image sensor by a computer system;

processing data of each pixel with spectral calibration data from a calibration module, wherein the calibration module comprises a broadband light source to emit light in a range of wavelengths, a wavelength selective device capable of scanning and dividing the broadband light source into multiple wavelengths, and an integration sphere to project the light into the image sensor, and wherein the calibration module collects and saves the spectral calibration data of each pixel of the image sensor;

synchronizing the temporal information from the clock; and reconstructing spectrum of the object.

10. A method to operate a sequential spectral imaging camera according to claim 9, further comprising imaging processing comprising correction of distortion with the help of an algorithm such as simultaneous localization and mapping (SLAM) and 3D volumetric spectral extraction.

11. A sequential spectral imaging camera, comprising:

an image sensor amounted on a camera, wherein the image sensor comprises a plurality of pixels sensitive to light signals;

a color filter disposed on the image sensor, wherein the color filter is configured to respond to a plurality of colors based on locations on the color filter, wherein the image sensor acquires a sequence of image frames each associated with spectral, spatial, and temporal data of an object moving relatively to the camera, wherein one image frame corresponds to one temporal point;

a clock used to add temporal information to the sequence of image frames, for each pixel on the image sensor; and a computer system capable of recording the sequence of image frames, comparing data of each pixel with spectral calibration data from a calibration module, synchronizing the temporal information from the clock, and reconstructing images of the object;

wherein the calibration module comprises a broadband light source to emit light in a range of wavelengths, a wavelength selective device capable of scanning and dividing the broadband light source into multiple wavelengths, and an integration sphere to project the light into the image sensor, wherein the calibration module collects and saves the spectral calibration data of each pixel of the image sensor.

12. The sequential spectral imaging camera as in claim 11, wherein the color filter comprises wavelength regions arranged monotonically along column and rows of the image sensor.

13. A sequential spectral imaging system as in claim 11, wherein the image sensor has a spectral response in the UV, visible and near IR and mid-IR range.

14. A calibration apparatus to set up a sequential spectral imaging system as in claim 11, further comprising:

a data recorder recording a spectral response data for each of the pixels of the image sensor as a calibration data.

* * * * *